(12) United States Patent
Nakazawa

(10) Patent No.: US 12,076,816 B2
(45) Date of Patent: Sep. 3, 2024

(54) LASER SCANNER AND LASER MACHINING DEVICE

(71) Applicant: KAWASAKI JUKOGYO KABUSHIKI KAISHA, Kobe (JP)

(72) Inventor: Mutsuhiro Nakazawa, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 798 days.

(21) Appl. No.: 17/250,805

(22) PCT Filed: Aug. 30, 2019

(86) PCT No.: PCT/JP2019/034038
§ 371 (c)(1),
(2) Date: Mar. 4, 2021

(87) PCT Pub. No.: WO2020/050148
PCT Pub. Date: Mar. 12, 2020

(65) Prior Publication Data
US 2021/0316395 A1   Oct. 14, 2021

(30) Foreign Application Priority Data

Sep. 7, 2018 (JP) ................................. 2018-167427

(51) Int. Cl.
*B23K 26/082* (2014.01)
*B23K 26/06* (2014.01)
(Continued)

(52) U.S. Cl.
CPC ........ *B23K 26/0821* (2015.10); *B23K 26/064* (2015.10); *B23K 26/0665* (2013.01); *B23K 26/0823* (2013.01)

(58) Field of Classification Search
CPC .............. B23K 26/0821; B23K 26/064; B23K 26/0665; B23K 26/0823; H04N 9/3129; H04N 9/3161
See application file for complete search history.

(56) References Cited

U.S. PATENT DOCUMENTS 4,023,201 A * 5/1977 Faulkner ................. E21B 47/07
250/342
4,204,122 A    5/1980 Menke
(Continued)

FOREIGN PATENT DOCUMENTS

CN    103728725    4/2014
CN    105364307    3/2016
(Continued)

OTHER PUBLICATIONS

Machine Translation of Nakamori et al, (JP H06-148556), performed on Jan. 9, 2024 (Year: 1994).*

Primary Examiner — Brian W Jennison
(74) Attorney, Agent, or Firm — Fay Kaplun & Marcin, LLP

(57) ABSTRACT

A laser scanner includes a rotary member, light-transmitting glasses, and a mirror. The rotary member rotates about a rotation axis. The light-transmitting glasses are disposed on the rotary member. The mirror guides a laser beam such that the laser beam is incident on the light-transmitting glass. When the rotary member is viewed in a direction parallel to the rotation axis, a polygon is formed by connecting inner surfaces of the light-transmitting glasses. Given that the angle formed between the inner surface of each light-transmitting glass and a straight line parallel to the rotation axis is defined as an inclination angle, the inclination angles of at least two of the light-transmitting glasses have different values.

11 Claims, 10 Drawing Sheets

(51) Int. Cl.
   *B23K 26/064*  (2014.01)
   *B23K 26/08*   (2014.01)

(56) References Cited

U.S. PATENT DOCUMENTS

| | | | |
|---|---|---|---|
| 4,714,960 A * | 12/1987 | Laakmann | G02B 26/12 |
| | | | 348/E3.01 |
| 4,932,732 A | 6/1990 | Nakajima | |
| 2009/0159578 A1 | 6/2009 | Lin et al. | |
| 2010/0020377 A1* | 1/2010 | Borchers | H04N 9/3129 |
| | | | 359/216.1 |
| 2014/0036331 A1* | 2/2014 | Kuge | B23K 26/043 |
| | | | 219/121.68 |
| 2016/0216204 A1 | 7/2016 | Marshall et al. | |
| 2019/0154807 A1* | 5/2019 | Steinkogler | G06K 7/10702 |
| 2022/0211437 A1* | 7/2022 | Ben-Oren | A61B 18/24 |

FOREIGN PATENT DOCUMENTS

| | | |
|---|---|---|
| CN | 107209115 | 9/2017 |
| GB | 2 047 424 | 11/1980 |
| GB | 2 076 992 | 12/1981 |
| JP | 5-11211 | 1/1993 |
| JP | H06148556 | 5/1994 |
| JP | 2001225183 | 8/2001 |
| JP | 2017144465 | 8/2017 |

\* cited by examiner

SECOND SCANNING DIRECTION
(DIRECTION PARALLEL TO ROTATION AXIS)

1ST SIDE ⟷ 2ND SIDE

FIRST SCANNING DIRECTION
(DIRECTION PERPENDICULAR TO ROTATION AXIS)

1ST SIDE ⟷ 2ND SIDE

FIRST SCANNING DIRECTION
(DIRECTION PERPENDICULAR TO ROTATION AXIS)

FIRST SCANNING DIRECTION
(DIRECTION PERPENDICULAR TO ROTATION AXIS)

SECOND SCANNING DIRECTION
(DIRECTION PARALLEL TO ROTATION AXIS)

LASER SCANNER AND LASER MACHINING DEVICE

TECHNICAL FIELD

The present invention primarily relates to a laser scanner that scans with a laser beam.

BACKGROUND ART

Patent Literature 1 (PTL 1) discloses a multibeam laser device including an infrared laser source and a splitter module. The splitter module has two or more splitters and one mirror that are arranged side by side. The splitter module, which is irradiated with an infrared laser beam, splits the laser beam into a plurality of parallel laser beams.

CITATION LIST

Patent Literature

PTL 1: Specification of U.S. Patent Application Publication No. 2009/0159578

SUMMARY OF INVENTION

The multibeam laser device according to PTL 1 is configured to scan with a laser beam in one direction. In this type of laser device, it is likely that the same portion is irradiated with laser beams at short time intervals. This results in a thermal effect on an ablation process.

The present invention is made in view of the circumstances described above, and primarily aims to provide a laser scanner for performing an ablation process with a small thermal effect, for enabling a machining process such as cutting to be performed efficiently and uniformly.

An aspect of the present invention provides a laser scanner configured as follows. The laser scanner includes a rotary member, light-transmitting members, and a light guide member. The rotary member rotates about a rotation axis. The light-transmitting members are disposed on the rotary member. The light guide member guides a laser beam such that the laser beam is incident on the light-transmitting member. When the rotary member is viewed in a direction parallel to the rotation axis, a polygon is formed by connecting inner surfaces of the light-transmitting members, the inner surfaces being surfaces on the side facing the rotation axis. Given that an angle formed between the inner surface of each light-transmitting member and a straight line parallel to the rotation axis is defined as an inclination angle, the inclination angles of at least two of the light-transmitting members have different values.

With this configuration in which the inner surfaces of the light-transmitting members form a polygon when connected, rotation of the light-transmitting members allows one surface of the light-transmitting member to be scanned with a laser beam in one direction perpendicular to the rotation axis. In addition, since the inclination angles of at least two of the light-transmitting members have different values, one surface of each light-transmitting member can be scanned (a laser beam can be shifted) in a direction parallel to the rotation axis. As the light-transmitting members rotate, the two are moved so that scanning is performed with a laser beam in two directions. The laser beam, therefore, can be treated like a laser beam having a large apparent beam diameter.

Furthermore, the laser beam is applied dispersedly in two scanning directions. Thus, once a laser beam is applied to a portion, a vicinity of the portion is less likely to be irradiated with a laser beam soon. This can facilitate diffusion of heat that has remained after an ablation process including laser beam application. That is, the ablation process has a reduced thermal effect. Accordingly, a machining process such as cutting can be performed efficiently and uniformly.

The present invention can provide a laser scanner capable of reducing the thermal effect involved in an ablation process, for enabling a machining process such as cutting to be performed efficiently and uniformly.

DESCRIPTION OF EMBODIMENTS

Figure 1:
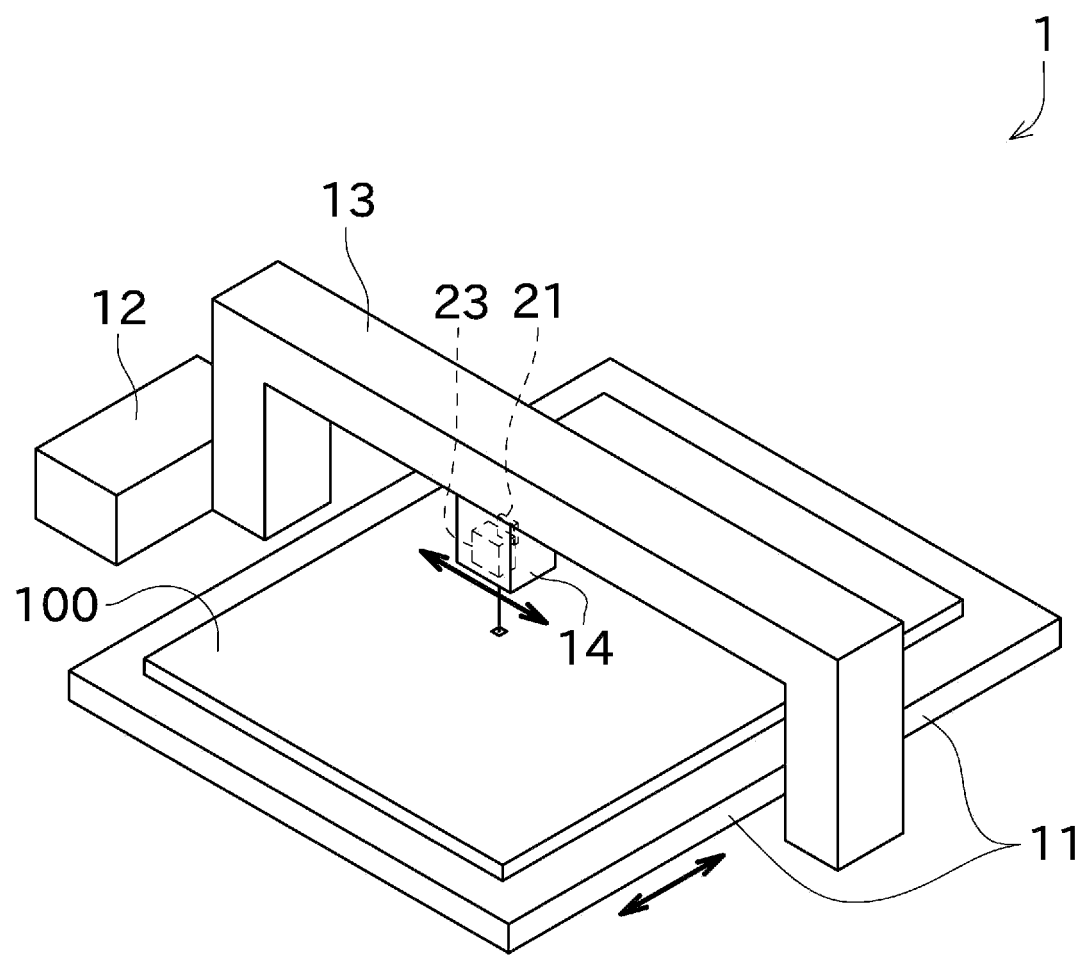
FIG. 1 shows a perspective view showing an overall configuration of a laser processing apparatus according to an embodiment of the present invention.

Hereinafter, an embodiment of the present invention will be described with reference to the drawings. First, referring to FIG. 1, a configuration of a laser processing apparatus 1 will be described. FIG. 1 is a perspective view of the laser processing apparatus 1. The laser processing apparatus 1 is an apparatus that subjects a work 100 to a machining process by applying a laser beam to the work 100.

The work 100 of this embodiment is plate-shaped and made of, for example, a carbon fiber reinforced plastic (CFRP). The work 100 may be made of another material. The work 100 does not always need to be plate-shaped, and for example, may be block-shaped.

The laser processing apparatus 1 of this embodiment performs an ablation process in which the laser processing apparatus 1 applies a laser beam to the work 100, for vaporization and removal of a part of the work 100. The laser processing apparatus 1 also performs a machining process in which the laser processing apparatus 1 cuts the work 100 by using a laser beam. The machining process that the laser processing apparatus 1 performs on the work 100 is not limited to cutting, but may include, for example, a machining process for causing a groove, a hole, or the like, with a predetermined shape to be formed on a surface of the work 100. The laser beam may be visible light, or may be an electromagnetic wave having a wavelength range (for example, corresponding to infrared light or ultraviolet light) different from that of visible light.

As shown in FIG. 1, the laser processing apparatus 1 includes a moving part 11, a laser generator 12, a support member 13, and a processing head 14.

The moving part 11 is a table capable of one-axis movement. The work 100 is placed on the moving part 11.

The laser generator 12, by pulse oscillation, generates a pulsed laser at short time intervals. The time intervals of the pulsed laser are not particularly limited. For example, the laser beam is generated at short time intervals of nanosecond order, picosecond order, femtosecond order, or the like. Alternatively, the laser generator 12 may be configured to generate a CW laser by continuous wave oscillation.

The support member 13 includes a movable mechanism located above the work 100. The processing head 14 is attached to the movable mechanism. Operating the movable mechanism with an electric motor (not shown) allows the processing head 14 to move in a width direction of the work 100. Disposed inside the support member 13 are two or more optics for guiding a laser beam generated by the laser generator 12 to the processing head 14. Alternatively, guiding light from the laser generator 12 to the processing head 14 may be implemented by using an optical fiber, or by using a mirror, a prism, etc.

The processing head 14 applies the laser beam, which has been generated by the laser generator 12 and has passed through the support member 13, to the work 100. In the processing head 14, a condensing member 21 and a laser scanner 23 are disposed. The condensing member 21 is a condenser lens or a parabolic mirror that condenses the laser beam. The laser scanner 23 scans with a laser beam having a beam diameter in two directions (two-dimensional scanning), and thereby enlarges an apparent beam diameter at a condensing point (details will be given below). By moving (if necessary, reciprocating) the processing head 14 from a first end to a second end of the work 100 with application of a laser beam from the processing head 14, the work 100 can be cut.

Figure 2:
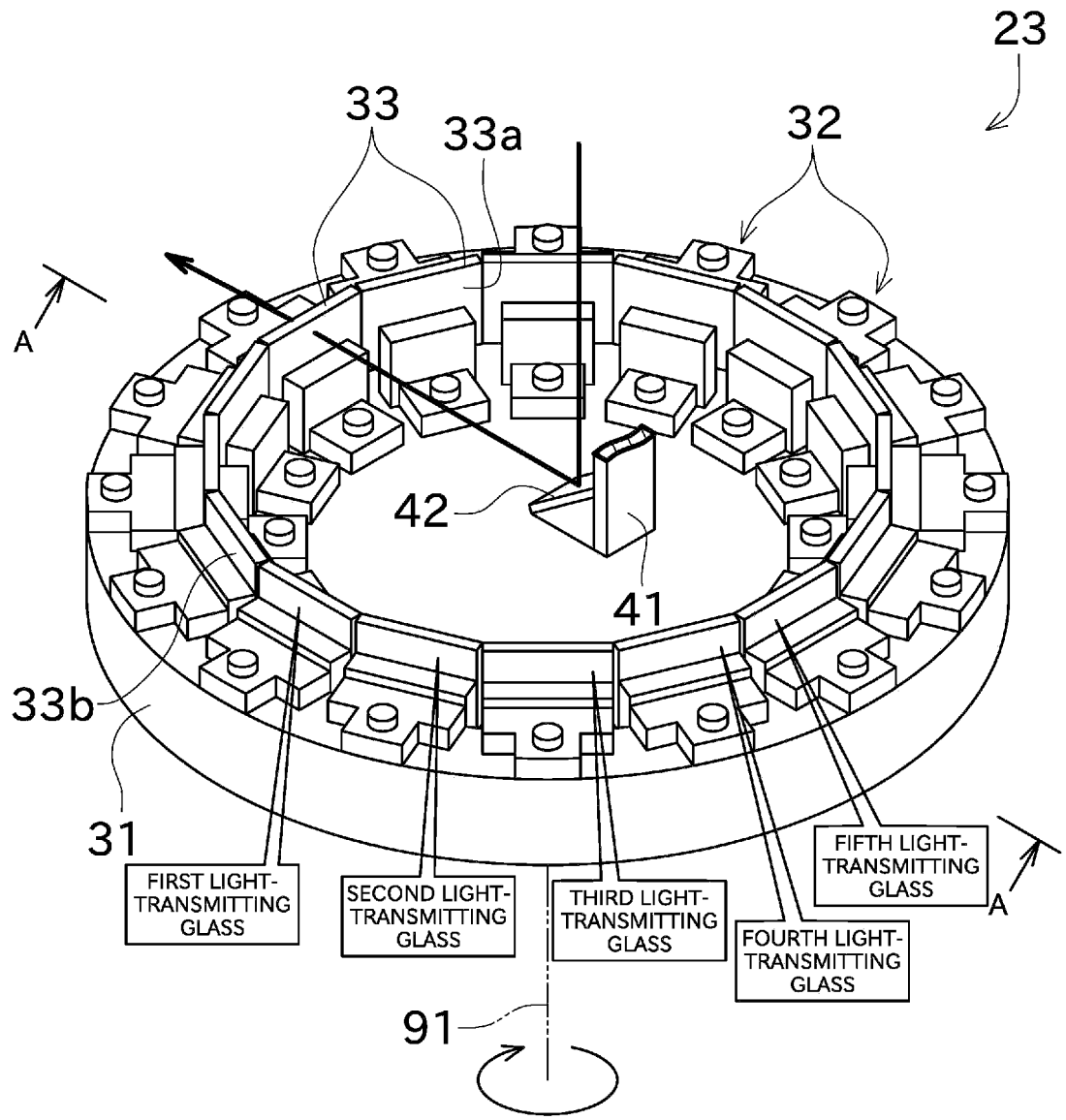
FIG. 2 shows a perspective view of a laser scanner.
Figure 3:
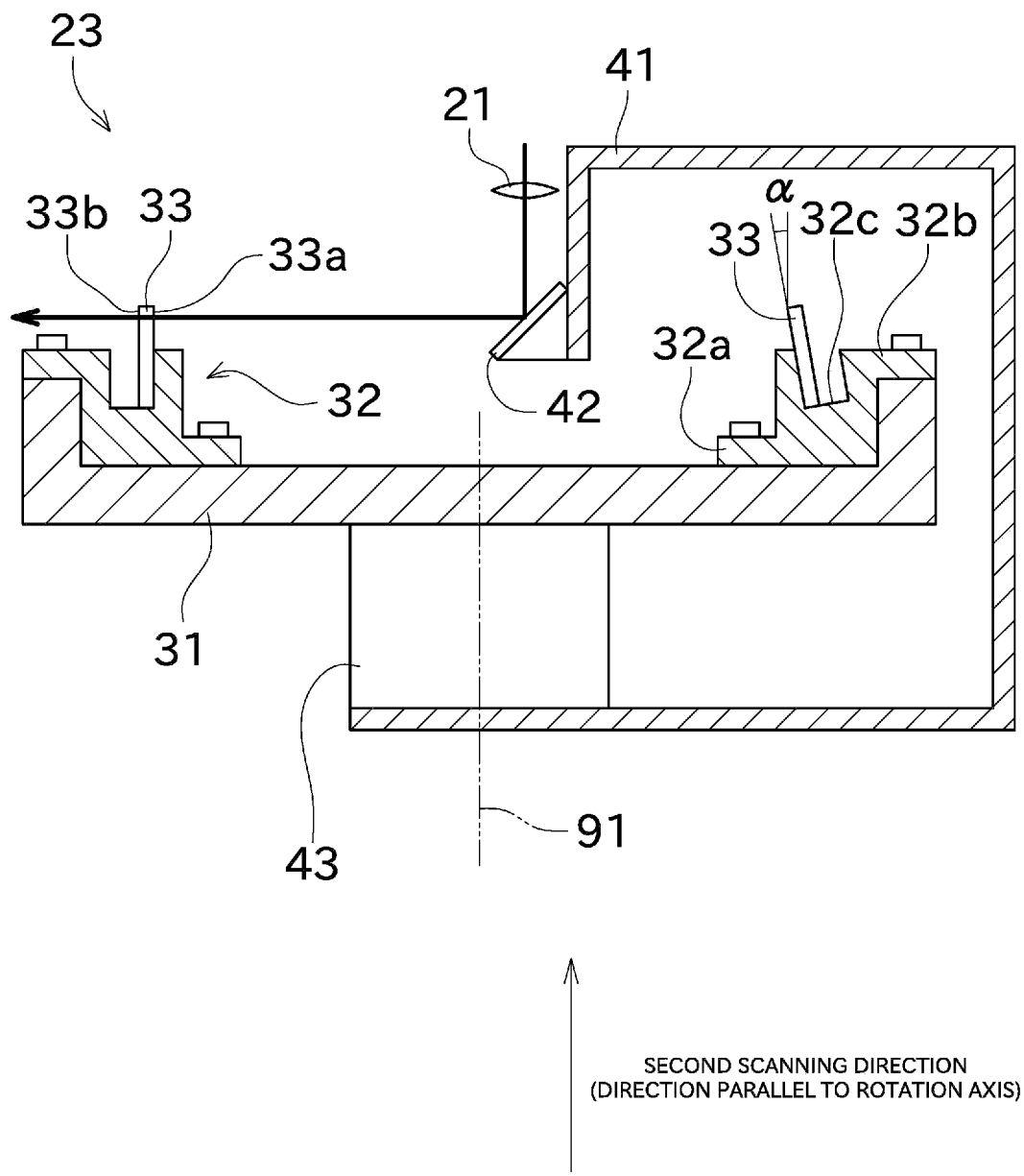
FIG. 3 shows a side cross-sectional view of the laser scanner (showing a cross-section as taken along A-A of FIG. 2)

Next, referring to FIG. 2 and FIG. 3, a configuration of the laser scanner 23 will be mainly described in detail. FIG. 2 is a perspective view of the laser scanner 23. FIG. 3 is a side cross-sectional view of the laser scanner 23 (showing a cross-section as taken along A-A of FIG. 2).

As shown in FIG. 2 and FIG. 3, the laser scanner 23 includes a rotary member 31, a plurality of glass holders 32, a plurality of light-transmitting glasses 33, a frame 41, a mirror 42, and an electric motor 43.

The rotary member 31, which is a substantially disc-shaped member whose outer periphery has a larger thickness, is configured to receive power supply from the electric motor 43 to thereby rotate about a rotation axis 91 illustrated in FIG. 3, etc. The rotation axis 91 passes through the center of the rotary member 31.

The electric motor 43 is attached to the frame 41. The frame 41 is not fixed to the rotary member 31 and does not move in conjunction with rotation of the rotary member 31. The mirror (light guide member) 42 as well as the condensing member 21 mentioned above is attached to the frame 41. As shown in FIG. 3, the condensing member 21 and the mirror 42 are disposed on the side opposite to the electric motor 43 across the rotary member 31. A laser beam generated by the laser generator 12 is guided in a direction parallel to the rotation axis 91, passes through the condensing member 21, and is reflected by the mirror 42. As a result of reflection by the mirror 42, the laser beam changes its direction by 90 degrees, to travel toward the light-transmitting glass 33. Since the rotary member 31 is rotating, which of the light-transmitting glasses 33 the laser beam passes through depends on a rotational phase of the rotary member 31.

The plurality of glass holders 32 have identical shapes. Each of the glass holders 32 is capable of having the light-transmitting glass 33 attached thereto and is fixed to the rotary member 31. Thus, the light-transmitting glass 33 rotates integrally with the rotary member 31. As shown in FIG. 3, the glass holder 32 includes a first fixed part 32a, a second fixed part 32b, and a glass attaching part 32c.

The first fixed part 32a and the second fixed part 32b are parts that are fixed to the rotary member 31 with bolts. The axial directions of the bolts for fixing the first fixed part 32a and the second fixed part 32b are in parallel to the rotation axis 91. Accordingly, for example, even when the rotary member 31 is rotated at a high speed, its centrifugal force does not act in an unbolting direction. Thus, loosening of the bolts is less likely to occur. To the glass attaching part 32c, the light-transmitting glass 33 is attached.

The plurality of light-transmitting glasses 33 have identical shapes. Each of the light-transmitting glasses 33 of this embodiment is shaped like a rectangular plate having an inner surface 33a and an outer surface 33b that are in parallel to each other. The inner surface 33a is a surface on the side facing the rotation axis 91. The outer surface 33b is a surface on the side opposite to the rotation axis 91. In this embodiment, a laser beam is incident on the inner surface 33a, and the laser beam exits from the outer surface 33b. The light-transmitting glass 33 is made of a material that allows a laser beam to be transmitted therethrough. The material of the light-transmitting glass 33 has a refractive index different from the refractive index of air (the refractive index of a gas existing in a space where the rotary member 31 is disposed). The light-transmitting glasses 33 are arranged radially about the rotation axis 91 so as to surround the rotation axis 91. To be specific, the plurality of light-transmitting glasses 33 are arranged such that when the rotary member 31 is viewed in a direction parallel to the rotation axis 91, a polygon is formed by connecting the inner surfaces 33a of the plurality of light-transmitting glasses 33. Since each inner surface 33a is in parallel to the corresponding outer surface 33b, connecting the outer surfaces 33b of the plurality of light-transmitting glasses 33 forms a polygon, too.

The light-transmitting glasses 33 may be arranged so as to form either a regular polygon or a polygon other than regular polygons.

Not all of the light-transmitting glasses 33 are disposed in parallel to the rotation axis 91, and some or all of the light-transmitting glasses 33 are disposed so as to be inclined relative to a straight line parallel to the rotation axis 91. More specifically, as shown in FIG. 3, some or all of the light-transmitting glasses 33 have different inclination angles $\alpha$, where the inclination angle $\alpha$ represents the angle formed between the inner surface 33a of each light-transmitting glass 33 and a straight line parallel to the rotation axis 91. In this embodiment, two or more types of glass holders 32 whose glass attaching parts 32c have different inclination angles are prepared, so that a variation of the inclination angle $\alpha$ is obtained.

As described above, the light-transmitting glasses 33 of this embodiment are arranged so as to form a polygon as well as so as to have different inclination angles $\alpha$. This configuration enables scanning with a laser beam in two directions, namely, a first scanning direction (direction perpendicular to the rotation axis 91) and a second scanning direction (direction parallel to the rotation axis 91). A description will be given below, with reference to FIGS.

Figure 4A:
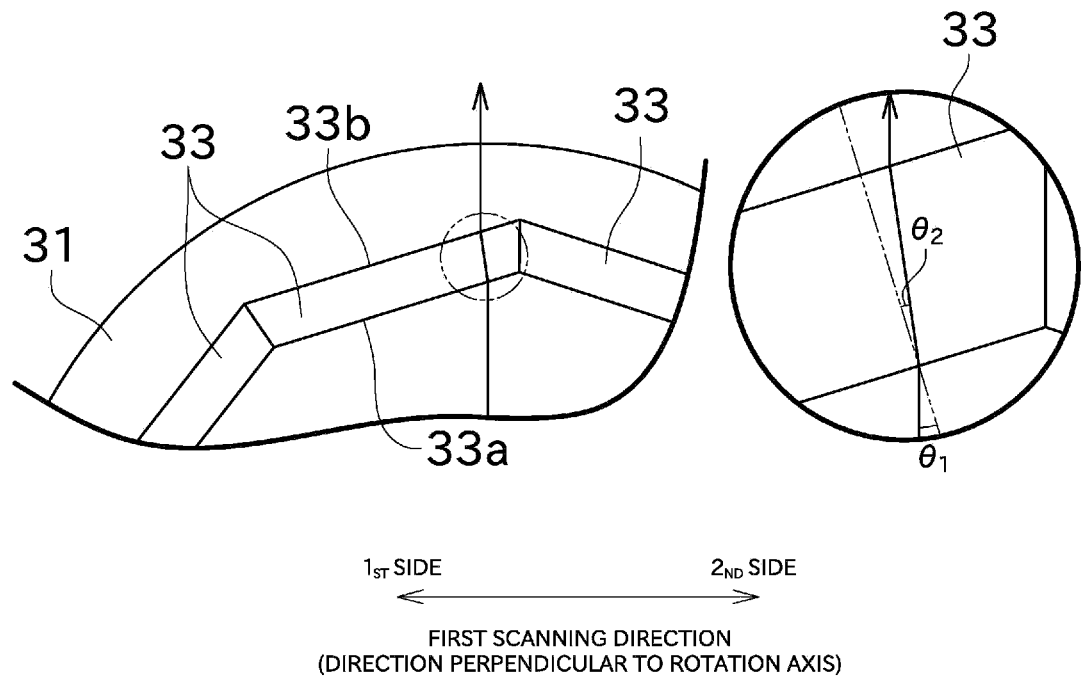
FIGS. 4A-C show explanatory diagrams illustrating scanning with a laser beam in a first scanning direction.
Figure 4B:
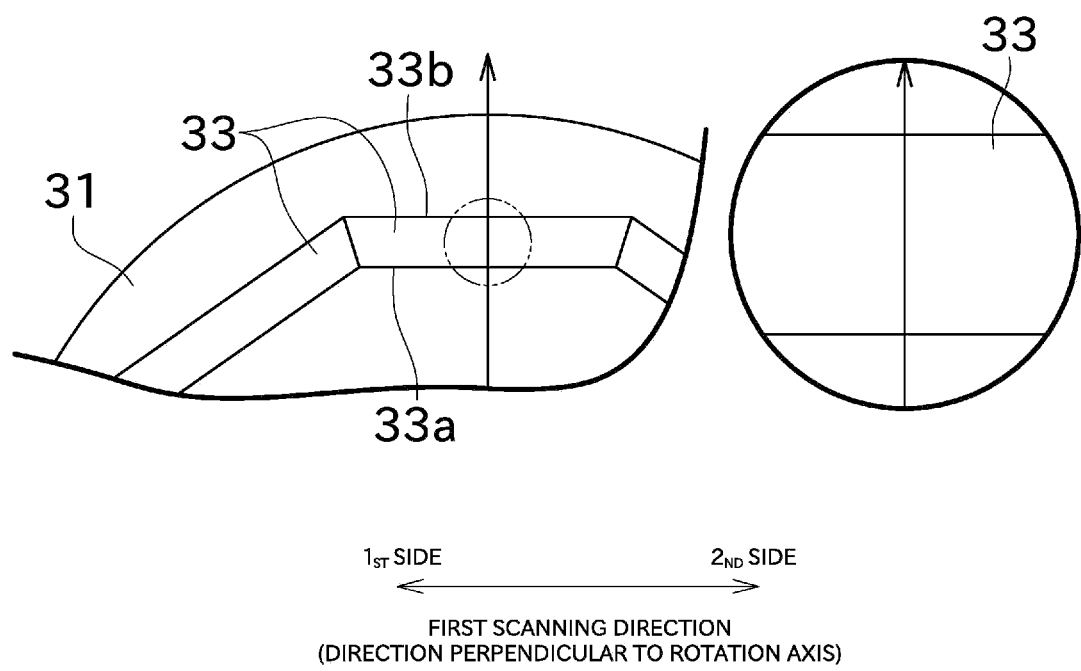
Figure 4C:
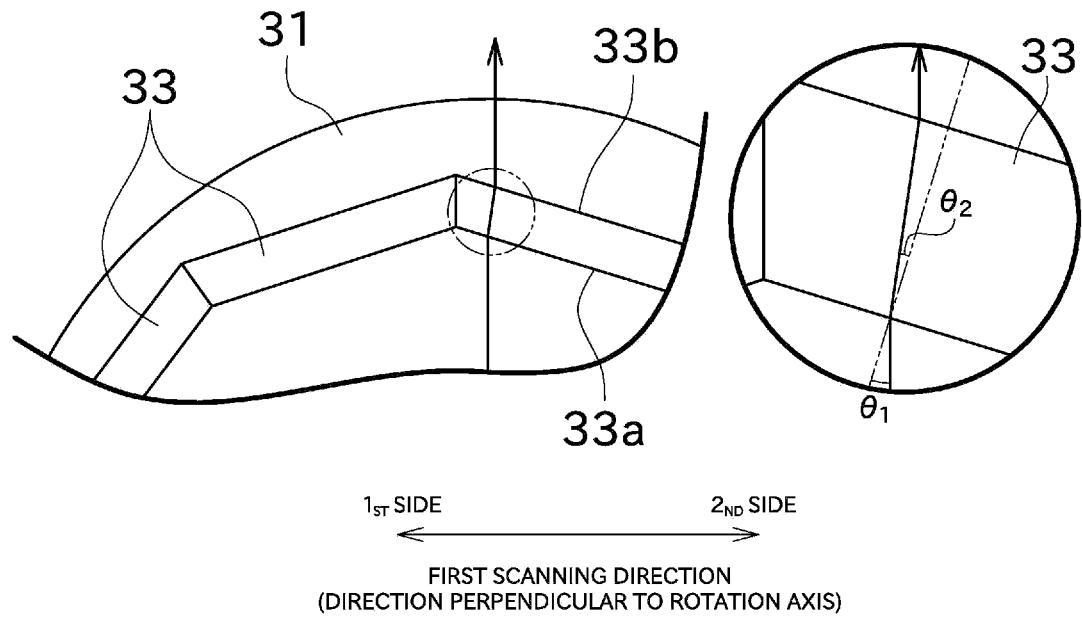
Figure 5A:
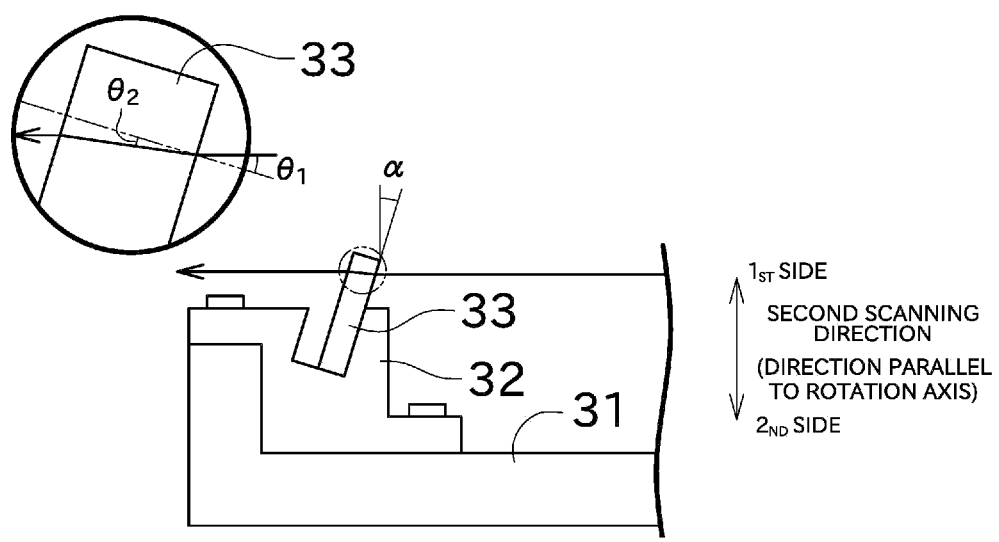
FIGS. 5A-C show explanatory diagrams illustrating scanning with a laser beam in a second scanning direction.
Figure 5B:
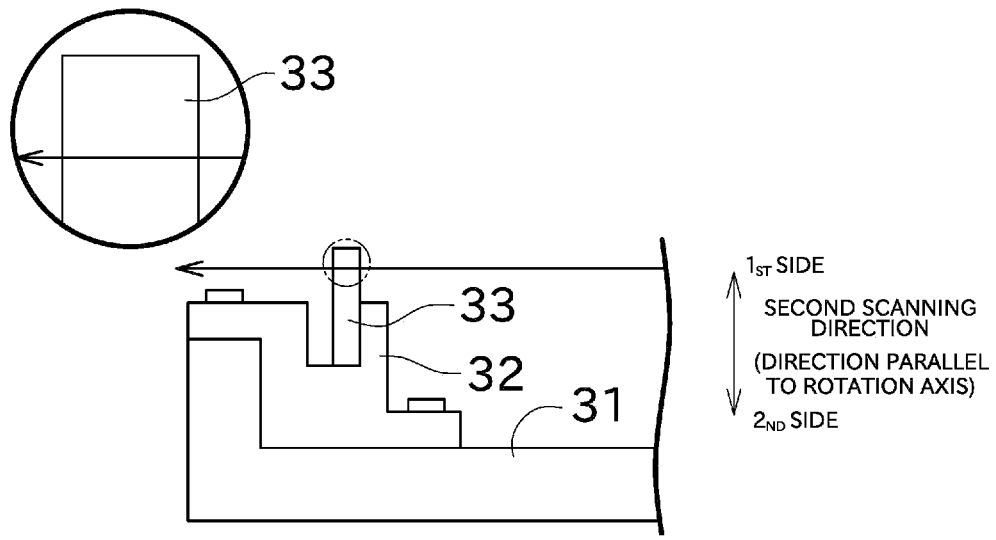
Figure 5C:
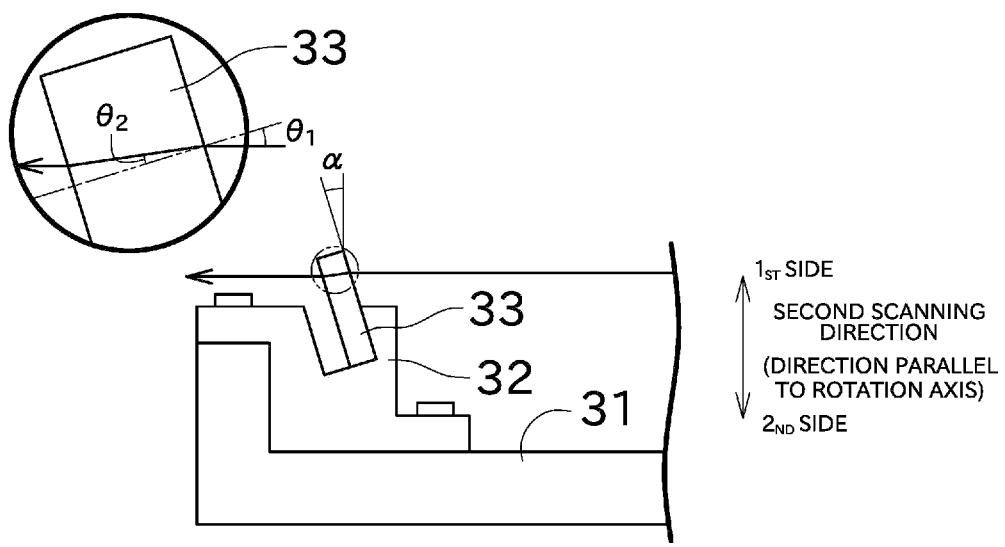

4A-C and FIGS. 5A-C. FIGS. 4A-C are an explanatory diagram illustrating scanning with a laser beam in the first scanning direction. FIGS. 5A-C are an explanatory diagram illustrating scanning with a laser beam in the second scanning direction. In FIGS. 4A-C and FIGS. 5A-C, to facilitate understanding of scanning with a laser beam, the relationship between an incident angle $\theta_1$ and a refraction angle $\theta_2$ is not depicted faithfully to the actual relationship (specifically, the refraction angle $\theta_2$ in the depiction is smaller than the actual one).

Referring to FIGS. 4A-C, scanning with a laser beam in the first scanning direction will be described. As shown in FIG. 4B, with a laser beam that is perpendicular to the inner surface 33a, the incident angle is zero degrees when viewed from the visual point in FIG. 4B, and therefore the laser beam is not refracted. Thus, the laser beam exits from the outer surface 33b without being offset in the first scanning direction.

Depending on the rotational phase of the rotary member 31, a laser beam that is not perpendicular to the inner surface 33a occurs. In such a situation, as shown in FIGS. 4A and 4C, a laser beam incident on the inner surface 33a of the light-transmitting glass 33 travels through the light-transmitting glass 33 while being refracted. Then, when exiting from the outer surface 33b of the light-transmitting glass 33, the laser beam is refracted again, so that the laser beam exiting from the outer surface 33b becomes parallel to the laser beam as it was when incident on the light-transmitting glass 33. In this manner, the laser beam is offset in the first scanning direction. Under a situation in which the polygon constituted by the inner surfaces 33a of the light-transmitting glasses 33 has an adequately small central angle and the rotation speed of the rotary member 31 is constant, laser beams (irradiation spots) are lined up at substantially equal pitches in the first scanning direction. The adequately small central angle means an angle that satisfies $\sin \theta \approx \theta$, where $\theta(rad)$ represents the central angle. For example, when the central angle is equal to or less than $\pi/4$ rad(45°), the adequately small central angle is obtained.

Since the incident angle varies in accordance with the angle formed between the laser beam and the inner surface 33a, the refraction angle varies accordingly. As a result, the amount of offset of the laser beam in the first scanning direction varies. The offset direction differs depending on whether the laser beam is transmitted through the upstream side of the longitudinal center of the light-transmitting glass 33 with respect to the rotation direction (FIG. 4A) or the downstream side of the longitudinal center of the light-transmitting glass 33 with respect to the rotation direction (FIG. 4C). With this configuration, while laser beams are transmitted through one light-transmitting glass 33, scanning with the laser beams in the first scanning direction can be performed (positions irradiated with the laser beams can be dispersed in the first scanning direction).

Next, referring to FIGS. 5A-C, scanning with a laser beam in the second scanning direction will be described. FIGS. 5A-C show the light-transmitting glass 33 and the like, as viewed in a direction that is perpendicular to the rotation axis 91 and perpendicular to the traveling direction of a laser beam being transmitted through the light-transmitting glass 33. As shown in FIG. 5B, in a case where the light-transmitting glass 33 through which the laser beam is transmitted is not inclined (in a case where the inclination angle $\alpha$ is zero), the incident angle is zero degrees when viewed from the visual point in FIG. 5B, and therefore the laser beam is not refracted. Thus, the laser beam exits from the outer surface 33b without being offset in the second scanning direction.

Here, at least one of the light-transmitting glasses 33 is disposed such that the light-transmitting glass 33 is inclined (the inclination angle $\alpha$ is not zero). When the light-transmitting glass 33 through which a laser beam is transmitted is inclined, its inner surface 33a is not perpendicular to the laser beam. In such a case, a laser beam incident on the inner surface 33a of the light-transmitting glass 33 travels through the light-transmitting glass 33 while being refracted. Then, when exiting from the outer surface 33b of the light-transmitting glass 33, the laser beam is refracted again, so that the laser beam exiting from the outer surface 33b becomes parallel to the laser beam as it was when incident on the light-transmitting glass 33. In this manner, the laser beam is offset in the second scanning direction.

Since the incident angle varies in accordance with the inclination angle $\alpha$ of the light-transmitting glass 33, the refraction angle varies accordingly. As a result, the amount of offset of the laser beam in the second scanning direction varies. The offset direction differs depending on whether the light-transmitting glass 33 is inclined inward, i.e., toward the rotation axis 91 (FIG. 5A) or inclined outward of the laser scanner 23 (FIG. 5C). With this configuration, scanning with laser beams in the second scanning direction can be performed (positions irradiated with laser beams can be dispersed in the second scanning direction) in accordance with the inclination angles $\alpha$ of the light-transmitting glasses 33 through which the laser beams are transmitted.

Figure 6:
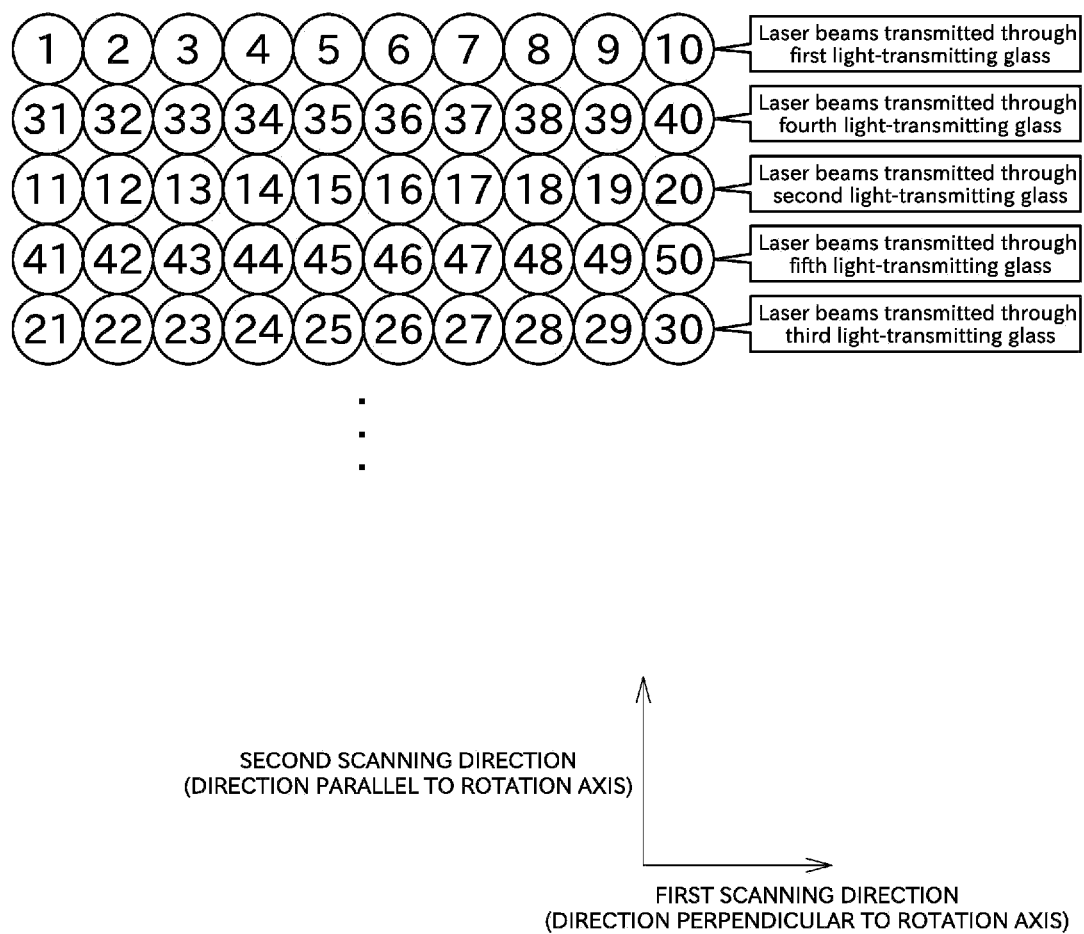
FIG. 6 shows a diagram indicating a sequence in which laser beams are applied.
Figure 7:
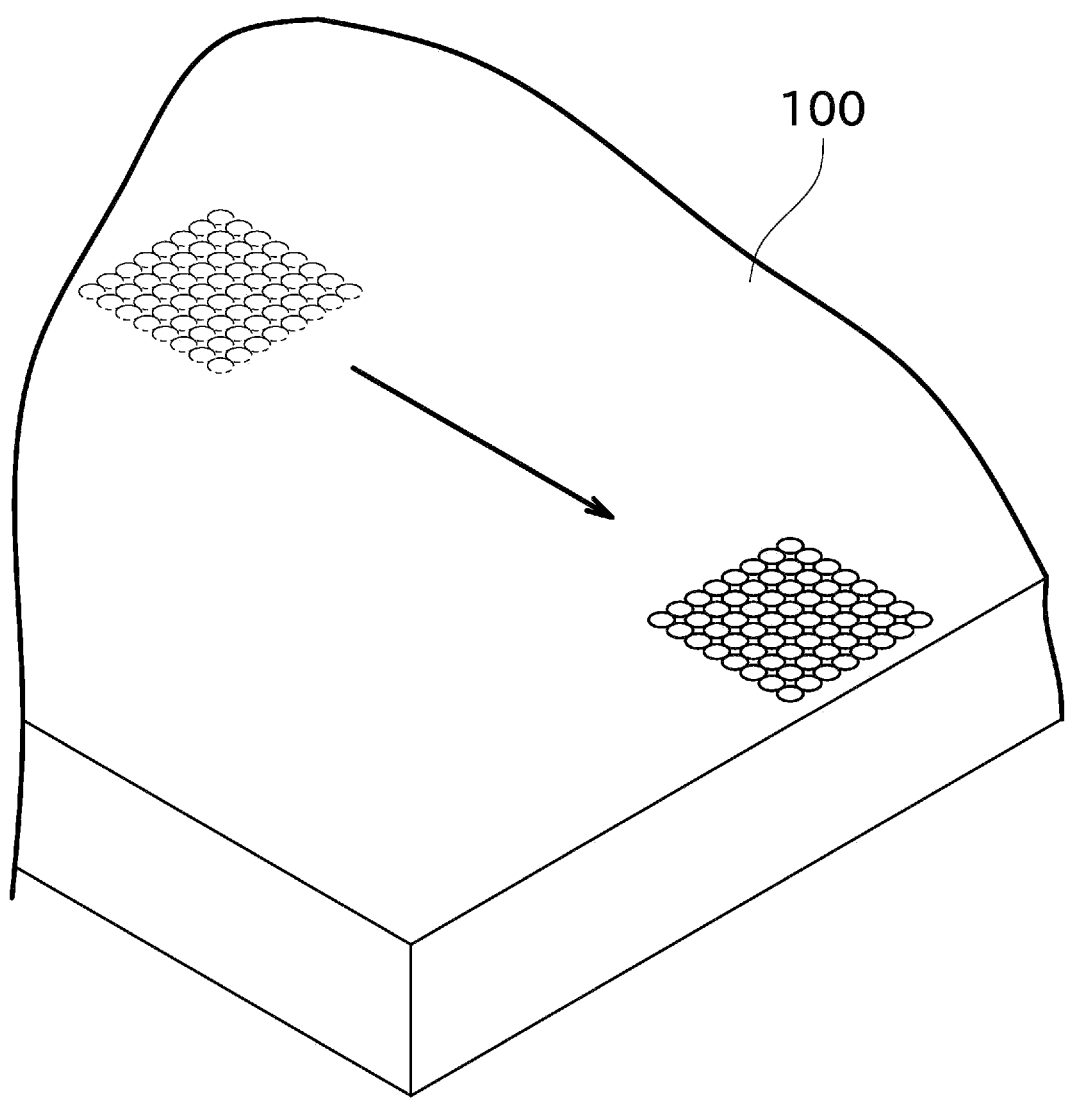
FIG. 7 shows a perspective view schematically illustrating laser beams being applied to a work, the laser beams having large apparent beam diameters.

Next, referring to FIG. 6 and FIG. 7, how laser beams are dispersedly applied in the laser processing apparatus 1 of this embodiment will be described. FIG. 6 is a diagram indicating a sequence in which laser beams are applied. FIG. 7 is a perspective view schematically illustrating laser beams being applied to the work 100, the laser beams having large apparent beam diameters. The following description, for simplification purposes, deals with laser beams that are applied while the rotary member 31 is rotating with the processing head 14 fixed.

In the following description, five light-transmitting glasses 33 that are arranged adjacent to one another will be referred to as a first light-transmitting glass, a second light-transmitting glass, . . . a fifth light-transmitting glass according to the order in which laser beams are transmitted through the light-transmitting glasses 33, as shown in FIG. 2. The first to fifth light-transmitting glasses have different inclination angles $\alpha$. The following describes how scanning is made with laser beams transmitted through the first to fifth light-transmitting glasses.

First, laser beams are transmitted through the first light-transmitting glass. The laser beams are offset in the first scanning direction in accordance with the rotational phase of the rotary member 31. As a result, as shown in FIG. 6, laser beams No. 1 to No. 10 are applied along the first scanning direction. In FIG. 6, each circle represents a one-time laser beam (laser beam corresponding to one pulse), and the number in each circle indicates a sequence in which the laser beam is applied.

These laser beams, which are arranged side by side in the first scanning direction, are laser beams transmitted through one of the light-transmitting glasses 33. FIG. 6 shows the situation in a simplified manner, on the assumption that the laser beam is transmitted through each light-transmitting glass 33 ten times. In FIG. 6, adjacent circles are depicted as being in contact with each other.

Where in the second scanning direction is irradiated with a laser beam varies in accordance with the inclination angle α of the light-transmitting glass 33 through which the laser beam is transmitted. The inclination angles α of the first to fifth light-transmitting glasses are different from one another, as described above. This is why subsequent laser beams that are transmitted through the second light-transmitting glass become laser beams No. 11 to No. 20 along the first scanning direction, which are applied at positions different than No. 1 to No. 10 with respect to the second scanning direction. Likewise, laser beams transmitted through the third light-transmitting glass, the fourth light-transmitting glass, and the fifth light-transmitting glass become laser beams No. 21 to No. 30, laser beams No. 31 to No. 40, and laser beams No. 41 to No. 50, respectively, which are applied at different positions with respect to the second scanning direction.

The scanning in the second scanning direction will be described in more detail. In this embodiment, the laser beams transmitted through the first light-transmitting glass and the laser beams transmitted through the second light-transmitting glass are not adjacent to each other in the second scanning direction, but are spaced from each other by an interval that allows other laser beams to be applied therein. This is true not only to the first and second light-transmitting glasses but also to other adjacent light-transmitting glasses 33. A region corresponding to the interval in the second scanning direction is irradiated with other laser beams which will be applied later. That is, after a laser beam is applied to the work 100, an adjacent region is not irradiated with a laser beam soon. This can provide time for diffusion of heat that has remained after an ablation process including laser beam application. Consequently, a thermal effect involved in the ablation process can be further reduced. Accordingly, for example, in a case of cutting the work 100 through the ablation process, melting of a cut surface does not easily occur.

In this embodiment, the apparent beam diameter can be enlarged in both the first scanning direction and the second scanning direction. This can make the machining process saturation less influential as compared to a conventional configuration having only one scanning direction. The machining process saturation means that laser energy does not shift to ablation but is transformed into heat.

Here, as the rotation speed of the rotary member 31 decreases, regions irradiated with laser beams that are successively applied are more likely to overlap (for example, the area of overlap between the circle representing a region irradiated with No. 1 and the circle representing a region irradiated with No. 2 becomes larger). As a result, heat that has remained after the ablation process is less likely to diffuse, and therefore the thermal effect involved in the ablation process increases. The rotary member 31, therefore, is preferably rotated at a high speed (100 rps or more). This creates no or only a little overlap between the regions irradiated with laser beams that are successively applied, so that the thermal effect involved in the ablation process can be reduced.

The foregoing can be treated as if the processing head 14 emits a laser beam having a low apparent oscillation frequency and a large apparent beam diameter. Thus, as shown in FIG. 7, it is possible to perform a machining process, such as cutting, on the work 100 by moving the processing head 14 while applying laser beams having large apparent beam diameters. Here, it is preferable that a moving direction of the processing head 14 is in parallel to the first scanning direction. The moving direction of the processing head 14 may be in parallel to the second scanning direction or may be another direction.

Adjusting a focus in accordance with the progress of the machining process on the work 100 will now be described. As a result of vaporization and removal of a part of the work 100 with laser beams, the position of a surface of the work 100 (i.e., a machining process position) is changed. To be specific, the machining process position is displaced toward the downstream side in a plate thickness direction, and more particularly in a laser application direction.

In this embodiment, therefore, the relative position of a laser beam focus position to the machining process position in the work 100 is changed such that the focus position and the machining process position are brought relatively close to each other. Examples of how to change the relative position of the laser beam focus position include moving the work 100 toward the upstream side in the laser application direction. This can fix the distance between a laser beam condensing point and the machining process position, so that the machining process on the work 100 can be efficiently performed. The laser beam focus position is changed in accordance with the progress of the machining process on the work 100. The progress of the machining process on the work 100 is calculated based on the number of times a laser beam is applied to the work 100, for example.

While the foregoing has described the laser processing apparatus 1 of this embodiment with reference to FIG. 1 to FIG. 7, the laser processing apparatus 1 can be modified as follows.

The moving part 11 shown in FIG. 1 does not always need to move in one axis, but may be capable moving in two or more axes. The moving part 11 may be configured to hold and move the work 100.

The processing head 14 shown in FIG. 1 does not always need to move in one axis, but may be capable of moving in two or more axes. It is also acceptable that a robot arm to which a component corresponding to the processing head 14 is mounted is moved to perform the machining process on the work 100.

It is also acceptable that the moving part 11 is omitted so that the work 100, which is immovably fixed, undergoes the machining process with movement of the processing head 14. Contrary to this, the position of the processing head 14 may be fixed so that the machining process is performed with movement of the work 100 by the moving part 11.

All of the light-transmitting glasses 33 shown in FIG. 2 have identical shapes, but alternatively, a different shape may be included so long as all of the light-transmitting glasses 33 have their surfaces continuously connected. For instance, if the lengths of portions of the light-transmitting glasses 33 serving as the respective sides of the above-described polygon are diversified, the lengths of series of laser beams transmitted through the respective light-transmitting glasses 33 can be diversified in the first scanning direction. It therefore is possible to make an apparent beam shape not rectangular but circular. In addition, the thicknesses of some or all of the light-transmitting glass 33 may be varied. The larger the thickness of a light-transmitting glass 33 is, the greater the amount of offset in the first and second scanning directions can be made. Moreover, the light-transmitting glasses 33 may be made of a material other than glass, so long as the material has a characteristic of allowing a laser beam to be transmitted therethrough.

In this embodiment, when the rotary member 31 is viewed in a direction parallel to the rotation axis 91, the mirror 42 (a source that applies laser beams traveling toward the light-transmitting glasses 33) is surrounded by the light-transmitting glasses 33. Alternatively, the mirror 42 may be disposed outside a region surrounded by the light-transmitting glasses 33 as in a second variation which will be described later.

Instead of the mirror 42 shown in FIG. 2, a prism may be used as a light guide member to reflect a laser beam. A light guide member having any other configuration may also be employed so long as it has a function for guiding a laser beam generated by the laser generator 12 such that the laser beam is transmitted through the light-transmitting glasses 33.

The condensing member 21 shown in FIG. 3 is on the upstream side of the laser scanner 23 in the traveling direction of laser beams. Here, for example, the condensing member 21 may be disposed on the downstream side of the laser scanner 23 with use of a fθ lens as the condensing member 21. The condensing member 21 shown in FIG. 3 may be disposed between the mirror 42 and the light-transmitting glasses 33. In a case of guiding light so as to obtain an optical path length fixed irrespective of the position of the processing head 14, the condensing member 21 may be disposed not in the processing head 14 but in the support member 13.

The electric motor 43 shown in FIG. 3 may be an air motor.

Figure 8:
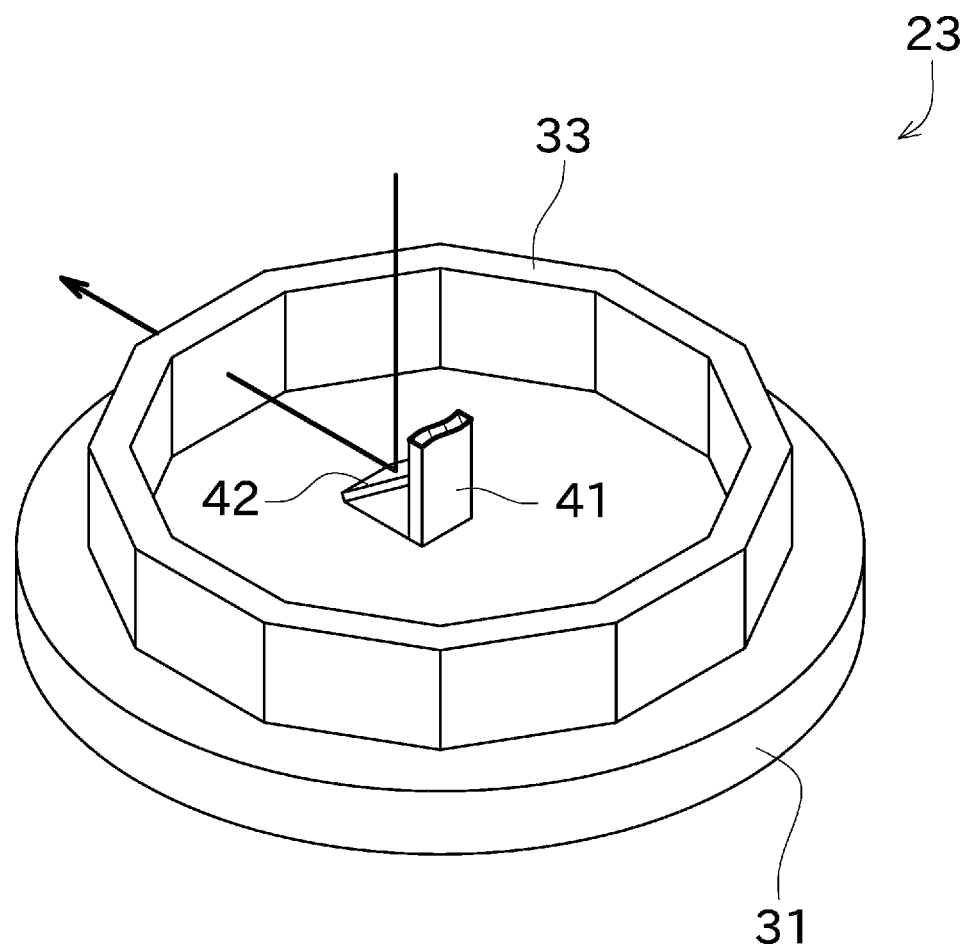
FIG. 8 shows a perspective view of a laser scanner according to a first variation.

A first variation will here be described with reference to FIG. 8. FIG. 8 is a perspective view of a laser scanner 23 according to a first variation. In the embodiment described above, the plurality of light-transmitting glasses 33 are arranged such that each of them corresponds to each side of the polygon. In the first variation, on the other hand, a single light-transmitting glass 33 is used, and its portions corresponding to the respective sides of a polygon are thickened. The laser scanner 23 of the first variation, like the embodiment described above, is capable of scanning with a laser beam in both the first scanning direction and the second scanning direction.

Figure 9:
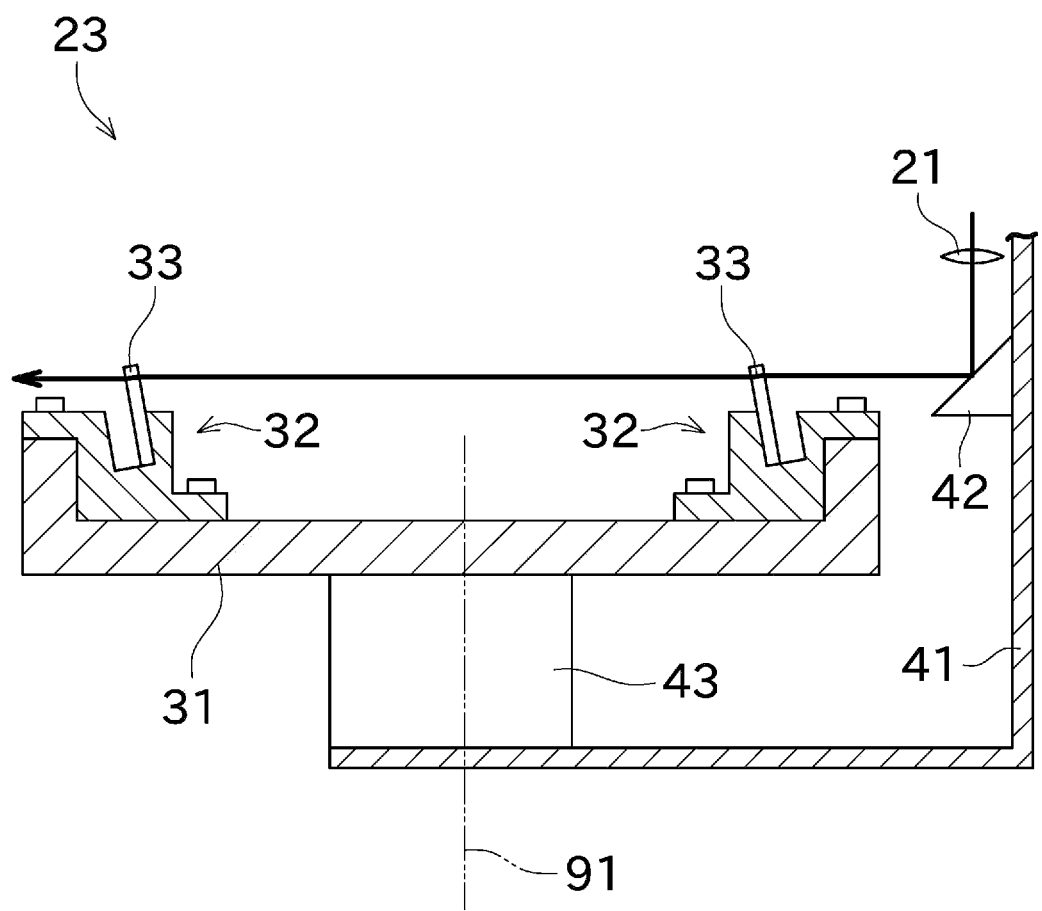
FIG. 9 shows a side cross-sectional view of a laser scanner according to a second variation.

A second variation will here be described with reference to FIG. 9. FIG. 9 is a side cross-sectional view of a laser scanner 23 according to the second variation. FIG. 9 is a diagram corresponding to FIG. 3 of the embodiment described above. In the embodiment described above, a laser beam having passed through the condensing member 21 is guided to the space surrounded by the light-transmitting glasses 33, and then is incident on the inner surface 33a of a light-transmitting glass 33. In the second variation, on the other hand, a laser beam having passed through the condensing member 21 is incident on the outer surface 33b of one light-transmitting glass 33 from the radially outside of the space surrounded by the light-transmitting glasses 33. After transmitted through this light-transmitting glass 33, the laser beam is incident on the inner surface 33a of another light-transmitting glass 33 from the space surrounded by the light-transmitting glasses 33, as in the embodiment described above.

In the second variation, therefore, a laser beam is transmitted through light-transmitting glasses 33 twice before the laser beam is applied to the work 100. In order that an offset direction in the first and second scanning directions at the first transmission and an offset direction in the first and second scanning directions at the second transmission can be uniform, two light-transmitting glasses 33 that are opposed to each other across the rotation axis 91 are parallel. Thus, when the rotary member 31 is viewed in a direction parallel to the rotation axis 91, the light-transmitting glasses 33 form a polygon having an even number of sides. Since opposed light-transmitting glasses 33 are parallel, the inclination angles α of the opposed light-transmitting glasses 33 are the same.

As thus far described, the laser scanner 23 according to the embodiment described above includes the rotary member 31, the light-transmitting glasses 33, and the mirror 42. The rotary member 31 rotates about the rotation axis 91. The light-transmitting glasses 33 are disposed on the rotary member 31. The mirror 42 guides a laser beam such that the laser beam is incident on the light-transmitting glass 33. When the rotary member 31 is viewed in a direction parallel to the rotation axis 91, a polygon is formed by connecting the inner surfaces 33a of the plurality of light-transmitting glasses 33. Given that the angle formed between the inner surface 33a of each light-transmitting glass 33 and a straight line parallel to the rotation axis 91 is defined as an inclination angle α, the inclination angles α of at least two of the light-transmitting glasses 33 have different values.

With this configuration in which the inner surfaces 33a of the light-transmitting glasses 33 form a polygon when connected, rotation of the light-transmitting glasses 33 allows one surface of the light-transmitting glass 33 to be scanned with a laser beam in one direction perpendicular to the rotation axis 91. In addition, since the inclination angles of at least two of light-transmitting members have different values, one surface of each light-transmitting glass 33 can be scanned (a laser beam can be shifted) in a direction parallel to the rotation axis 91. As the light-transmitting glasses 33 rotate, the two are moved so that scanning is performed with a laser beam in two directions. The laser beam, therefore, can be treated like a laser beam having a large apparent beam diameter.

Furthermore, the laser beams are applied dispersedly in two scanning directions. Thus, once laser beams are applied to a portion, a vicinity of the portion is less likely to be irradiated with other laser beams soon. This can facilitate diffusion of heat that has remained after the ablation process including laser beam application. That is, the ablation process has a reduced thermal effect. Accordingly, a machining process such as cutting can be performed efficiently and uniformly.

In the laser scanner 23 according to the embodiment described above, the mirror 42 guides a laser beam such that the laser beam is incident on the inner surface 33a of a light-transmitting glass 33.

This can downsize the laser scanner 23 as compared to the second variation.

In the laser scanner 23 according to the second variation, the number of sides of the polygon constituted by the light-transmitting glasses 33 (i.e., the number of light-transmitting glasses 33) is even, and two inner surfaces 33a opposed to each other across the rotation axis 91 are parallel. The mirror 42 guides a laser beam such that the laser beam is incident on the outer surface 33b of one light-transmitting glass 33. After transmitted through this outer surface 33b, the laser beam is incident on the inner surface 33a of another light-transmitting glass 33 opposed to the one light-transmitting glass 33.

Since the laser beam is transmitted through the light-transmitting glasses 33 twice, the amount of offset of the laser beam in the first and second scanning directions can be made greater.

In the laser scanner 23 according to the embodiment described above, the light-transmitting glasses 33, each of which is shaped like a flat plate, are arranged such that a polygon is formed by the plurality of light-transmitting glasses 33 when the rotary member 31 is viewed in a direction parallel to the rotation axis 91.

Accordingly, a light-transmitting glass 33 having a general shape can be used to embody the present invention.

In the laser scanner 23 according to the embodiment described above, as shown in FIG. 6, regions irradiated with a series of laser beams (No. 31 to No. 40 in FIG. 6) that have been transmitted through the fourth light-transmitting glass before applied to the work 100 are present between regions irradiated with a series of laser beams (No. 1 to No. 10 in FIG. 6) that have been transmitted through the first light-transmitting glass before applied to the work 100 and regions irradiated with a series of laser beams (No. 11 to No. 20 in FIG. 6) that have been transmitted through the second light-transmitting glass before applied to the work 100. The inner surface 33a of the first light-transmitting glass corresponds to "the first inner surface". The inner surface 33a of the second light-transmitting glass corresponds to "the second inner surface". The inner surface 33a of the fourth light-transmitting glass corresponds to "the inner surface that is not adjacent to either the first inner surface or the second inner surface".

This makes it less likely that laser beams are successively applied to the same portion. Accordingly, the thermal effect involved in the ablation process can be further reduced.

The laser processing apparatus 1 according to the embodiment described above includes the laser scanner 23, the laser generator 12, and the condensing member 21. The laser generator 12 generates a laser beam. The condensing member 21 condenses the laser beam.

Accordingly, the laser processing apparatus 1 with a reduced thermal effect involved in the ablation process can be obtained.

The laser processing apparatus 1 according to the embodiment described above includes the processing head 14 that applies a laser beam. The processing head 14 is configured to be movable.

Accordingly, the thermal effect involved in the ablation process is reduced even when the laser beam is moved by using the processing head 14.

REFERENCE SIGNS LIST 1 laser processing apparatus
21 condensing member
23 laser scanner
31 rotary member
332 glass holder
33 light-transmitting glass (light-transmitting member)
42 mirror (light guide member)

The invention claimed is:

1. A laser scanner, comprising:
a rotary member rotating about a rotation axis;
light-transmitting members disposed on the rotary member; and
a light guide member guiding a laser beam such that the laser beam is incident on the light-transmitting member,
wherein when the rotary member is viewed in a direction parallel to the rotation axis, a polygon is formed by connecting inner surfaces of the light-transmitting members, the inner surfaces being surfaces on a side facing the rotation axis, and
wherein, given that an angle formed between the inner surface of each light-transmitting member and a straight line parallel to the rotation axis is defined as an inclination angle, the inclination angles of at least two of the light-transmitting members have different values.

2. The laser scanner according to claim 1, wherein the light guide member guides a laser beam such that the laser beam is incident on the inner surface of the light-transmitting member.

3. The laser scanner according to claim 1, wherein the polygon has an even number of sides, and two of the inner surfaces opposed to each other across the rotation axis are in parallel to each other, wherein the light guide member guides a laser beam such that the laser beam is incident on an outer surface of one of the light-transmitting members, the outer surface being a surface on the side opposite to the inner surface, and wherein after transmitted through the outer surface, the laser beam is incident on the inner surface of another of the light-transmitting members that is opposed to the one of the light-transmitting members.

4. The laser scanner according to claim 1, wherein the light-transmitting members are shaped like flat plates and wherein when the rotary member is viewed in a direction parallel to the rotation axis, the light-transmitting members are arranged so as to form the polygon.

5. The laser scanner according to claim 1, wherein given that adjacent two of the inner surfaces of the light-transmitting members are called a first inner surface and a second inner surface, respectively and wherein a region irradiated with a laser beam transmitted through the inner surface that is not adjacent to either the first inner surface or the second inner surface is present between a region irradiated with a laser beam transmitted through the first inner surface and a region irradiated with a laser beam transmitted through the second inner surface.

6. A laser processing apparatus, comprising:
a laser scanner includes a rotary member rotating about a rotation axis; light-transmitting members disposed on the rotary member; and a light guide member guiding a laser beam such that the laser beam is incident on the light-transmitting member, wherein when the rotary member is viewed in a direction parallel to the rotation axis, a polygon is formed by connecting inner surfaces of the light-transmitting members, the inner surfaces being surfaces on the side facing the rotation axis and wherein, given that an angle formed between the inner surface of each light-transmitting member and a straight line parallel to the rotation axis is defined as an inclination angle, the inclination angles of at least two of the light-transmitting members have different values;
a laser generator generating the laser beam; and
a condensing member condensing the laser beam.

7. The laser processing apparatus according to claim 6, further comprising:
a processing head applying the laser beam, the processing head being configured to be movable.

8. The laser processing apparatus according to claim 6, wherein the light guide member guides a laser beam such that the laser beam is incident on the inner surface of the light-transmitting member.

9. The laser processing apparatus according to claim 6, wherein the polygon has an even number of sides, and two of the inner surfaces opposed to each other across the rotation axis are in parallel to each other, wherein the light guide member guides a laser beam such that the laser beam is incident on an outer surface of one of the light-transmitting members, the outer surface being a surface on the side opposite to the inner surface, and wherein after transmitted through the outer surface, the laser beam is incident on the inner surface of another of the light-transmitting members that is opposed to the one of the light-transmitting members.

10. The laser processing apparatus according to claim 6, wherein the light-transmitting members are shaped like flat plates and wherein when the rotary member is viewed in a direction parallel to the rotation axis, the light-transmitting members are arranged so as to form the polygon.

11. The laser processing apparatus according to claim 6, wherein given that adjacent two of the inner surfaces of the light-transmitting members are called a first inner surface and a second inner surface, respectively and wherein a region irradiated with a laser beam transmitted through the inner surface that is not adjacent to either the first inner surface or the second inner surface is present between a region irradiated with a laser beam transmitted through the first inner surface and a region irradiated with a laser beam transmitted through the second inner surface.

* * * * *